United States Patent [19]

Loten

[11] Patent Number: 5,138,713

[45] Date of Patent: Aug. 11, 1992

[54] MULTIPROCESSING COMPUTER SYSTEM WITH EXIT LOGIC AND METHOD FOR MAINTAINING RESOURCE INTEGRITY

[75] Inventor: Gregory P. Loten, Eastleigh, England

[73] Assignee: International Business Machines Corporation, Armonk, N.Y.

[21] Appl. No.: 422,938

[22] Filed: Oct. 17, 1989

[30] Foreign Application Priority Data

Oct. 28, 1988 [GB] United Kingdom ............... 88310187

[51] Int. Cl.$^5$ ............................................ G06F 11/00
[52] U.S. Cl. .................... 395/725; 371/67.1; 364/266.4; 364/266.5; 364/268; 364/DIG. 2; 364/265; 364/281.4; 364/282; 364/940.91; 364/943.91; 395/575
[58] Field of Search ................... 364/200, 900; 371/66, 371/10, 7, 67.1; 395/800, 575

[56] References Cited

U.S. PATENT DOCUMENTS

| | | | |
|---|---|---|---|
| 4,393,500 | 7/1983 | Imazeki et al. | 371/13 |
| 4,658,351 | 4/1987 | Teng | 364/200 |
| 4,819,154 | 4/1989 | Stiffler et al. | 364/200 |
| 4,860,228 | 2/1987 | Carroll | 364/561 |
| 4,922,456 | 5/1990 | Naddor et al. | 365/185 |

Primary Examiner—Thomas C. Lee
Assistant Examiner—Caleb Pollack
Attorney, Agent, or Firm—Robert L. Troike

[57] ABSTRACT

In order to maintain resource integrity in a multiprocessing computer system wherein a local variable which is accessible by a single process and a global variable which is accessible by a plurality of processes and is dependent on the local variable are updated sequentially and wherein the process may be terminated between the updating of the local and global variables, the expected value of the local variable and global variables are stored in first and second storage locations respectively before the local and global variables themselves are updated. If then, the process is terminated, a determination of whether the process was terminated between the updating of the local and global variables can be made by comparing the content of the first storage means to that of the local variable and by comparing the content of the second storage means to that of the global variable and, if necessary, remedial action can be undertaken to correct the values of the variables.

16 Claims, 10 Drawing Sheets

MULTIPROCESSING COMPUTER SYSTEM WITH EXIT LOGIC AND METHOD FOR MAINTAINING RESOURCE INTEGRITY

FIELD OF THE INVENTION

The invention relates to a multiprocessing computer system in which a plurality of processes each have access to at least one system resource.

BACKGROUND OF THE INVENTION

In multiprocessing computer systems where a plurality of processes have access to a system resource, which may be a unit of storage, or a register or a specific piece of system hardware, there are problems of access contention and resource integrity to be resolved. For example, in the case where the resource is a unit of storage, if one process is changing the content of the storage, then no other process should be allowed to access the resource until the first one has finished.

In prior art computer systems operating under a multi-tasking operating system, it is known to provide for multiple read access or an exclusive write access to a resource at any one time. This is achieved by means of global and local resource counts for counting the global number of permits for read access to a resource (i.e. the total number of read access permits for all processes to that resource) and the local number of read access permits for each process to that resource (i.e. for the number of read access permits by each process to that resource). The local resource counts for individual processes are needed in addition to the global resource count because each process may contain a plurality of "sub-processes" termed threads, each of which may require access independently to a resource. Write operations to a resource are only permitted when all the read access counts are zero for that resource. Sequential access to the read access counts can be guaranteed by the use of semaphores as is well known in the art; thus avoiding possible contention and integrity problems with regard to the counts.

A complication with the above system is that a process may be terminated early by the multi-tasking operating system in response to an abort instruction. The early aborting of a process can mean that some read accesses for that process are pending when it is aborted and consequently that the counts mentioned above may need to be reset in order to maintain system integrity. The termination of a process has typically been controlled by means of exit processing logic which is called by the operating system each time a process terminates.

A multiprocessing computer system is therefore known in which each of a plurality of processes can access at least one system resource, the multiprocessing computer system comprising:
- local count means for each process to maintain a count of permits for that process to access said resource;
- global count means to maintain a count of permits for all processes to access said resource;
- update logic for sequentially updating an appropriate local count means and the global count means each time a process requests or relinquishes use of the resource; and
- exit logic for terminating a process including means for resetting the global count means.

It has been determined that the known mechanism for dealing with process termination is potentially vulnerable if the process terminates abnormally in between the updating of the local and global request counts as these operations are performed by separate machine instructions, with the result that the counts will not be consistent. The difficulty is to detect whether the process was in this vulnerable phase when it was terminated in order that the exit processing logic may take appropriate action.

An object of the invention is, therefore, to provide a multiprocessing system of the above type which can effectively deal with such abnormal process termination.

SUMMARY OF THE INVENTION

In accordance with a first aspect of the present invention, a multiprocessing computer system of the above type is characterized in that:
- the update logic additionally comprises logic for storing expected local and global count values in first and second storage means respectively, before either of the appropriate local count means or the global count means are updated; and
- the exit logic additionally comprises logic for comparing the content of the first storage means to that of the appropriate local count means and for comparing the content of the second storage means to the global count means and, in dependence on the results of the comparisons, determining whether the process was terminated between the updating of the local and global count means.

Preferably, semaphore means are provided for ensuring that access may be had to the global count means by only one process at a time.

In an example of the invention to be described later, the local and global count means maintain a count of permits to read a resource. In this example, the expected value of the local count stored in the first storage means is the current local count plus an intended local count increment and the expected value of the global count stored in the second temporary storage means is the current global count plus an intended global count increment. It should be understood that the "increment" may be any positive or negative number.

In the aforementioned example, the update logic updates the local count means before the global count means and on process termination the exit logic tests whether the content of the first storage means is the same as that of the local count means and whether the content of the second storage means is different from that of the global count means, and, if both conditions are true, decrements the content of the local count means by the numerical difference between the content of the second storage means and that of the global count means. If, for example, the content of the second storage means is one less than the count of the global count means, the content of the local count means will be decremented by minus one (i.e. it will be increased by one). Note that the decrement may be by plus or minus any number depending on the result of the calculation: second storage means minus global count means.

Although in the example to be described later, the update logic stores the expected value of the local count before that of the global count, as an alternative, the update logic could update the global count means before the local count means. In this case, the exit logic would test whether the content of the second storage means is the same as that of the global count means and whether the content of the first storage means is different from that of the local count means, and, if both conditions are true, would decrement the content of the global count means by the numerical difference between the content of the first storage means and that of the local count means.

Control is simplified if the update logic stores the expected value of the local count and the global count in the first and second storage means, respectively, in the same chronological order as it updates the local and global count means. In this way the comparison of the expected and actual counts is sufficient to determine whether termination occurred between the updating of the local and global counts. However, if this test alone is going to be used to determine the point of termination, then it is preferable that the update logic should set the content of the first and second storage means to an invalid value, as a means of ensuring that the values have not been contaminated.

Preferably however, the updated logic additionally comprises logic for bracketing a section of logic including that for updating the local and global count means and the exit logic additionally comprises logic for testing whether a process was terminated during execution of the bracketed section of logic. If the chronological order of setting the expected values is not the same as the order of updating the count values, then the bracketing function should bracket only the three operations of setting with an expected value of the second of the first and second storage means to be set and the updating of the local and global count means.

One form of bracketing logic can be to set the content of at least one of the first and second storage means to an invalid value before said expected values are stored therein and to reset the content of said at least one of the first and second storage means to an invalid value after the local and global count means have been updated. The logic for testing the bracketed section of logic can then test whether the content of said at least one of said first and second storage means has a valid value.

In the example to be described later, however, bracketing logic is employed which, after storing the expected values, sets the content of a third storage means to the value of a unique identifier for the resource and which, after the updating of the local and global variables, resets the third storage means to an invalid value. The logic for testing the bracketed section of logic tests whether the content of the third storage means corresponds to that of a valid identifier, and if so identifies that resource. As well as providing an indication of the point at which termination occurred, this technique has the additional advantage of identifying the identity of the resource currently being accessed by the process being terminated. If the third storage means is used in this way, it is not essential to provide for the initial and subsequent setting of first and second storage means to an invalid value, although the logic described above for doing this could also be provided.

In accordance with a second aspect of the present invention there is provided a method of maintaining resource integrity in a multiprocessing computer system wherein a local variable which is accessible by a single process and a global variable which is accessible by a plurality of processes and is dependent on the local variable are updated sequentially and wherein the process may be terminated between the updating of the local and the global variable, said method comprising the steps of:

a) storing the expected value of the local variable in a first storage means and the expected value of the global variable in a second storage means; and then
b) updating said local variable and said global variable sequentially, and
c) if said process is terminated, determining whether the process was terminated between the updating of said local and global variables by comparing the content of the first storage means to that of the local variable and by comparing the content of the second storage means to that of the global variable and, if necessary, undertaking remedial action to correct the values of the variables.

BRIEF DESCRIPTION OF THE DRAWING

A particular example of a multiprocessing system in accordance with the present invention will be described hereinafter with reference to the accompanying drawings in which.

DESCRIPTION OF THE PREFERRED EMBODIMENT OF THE INVENTION

Figure 1:
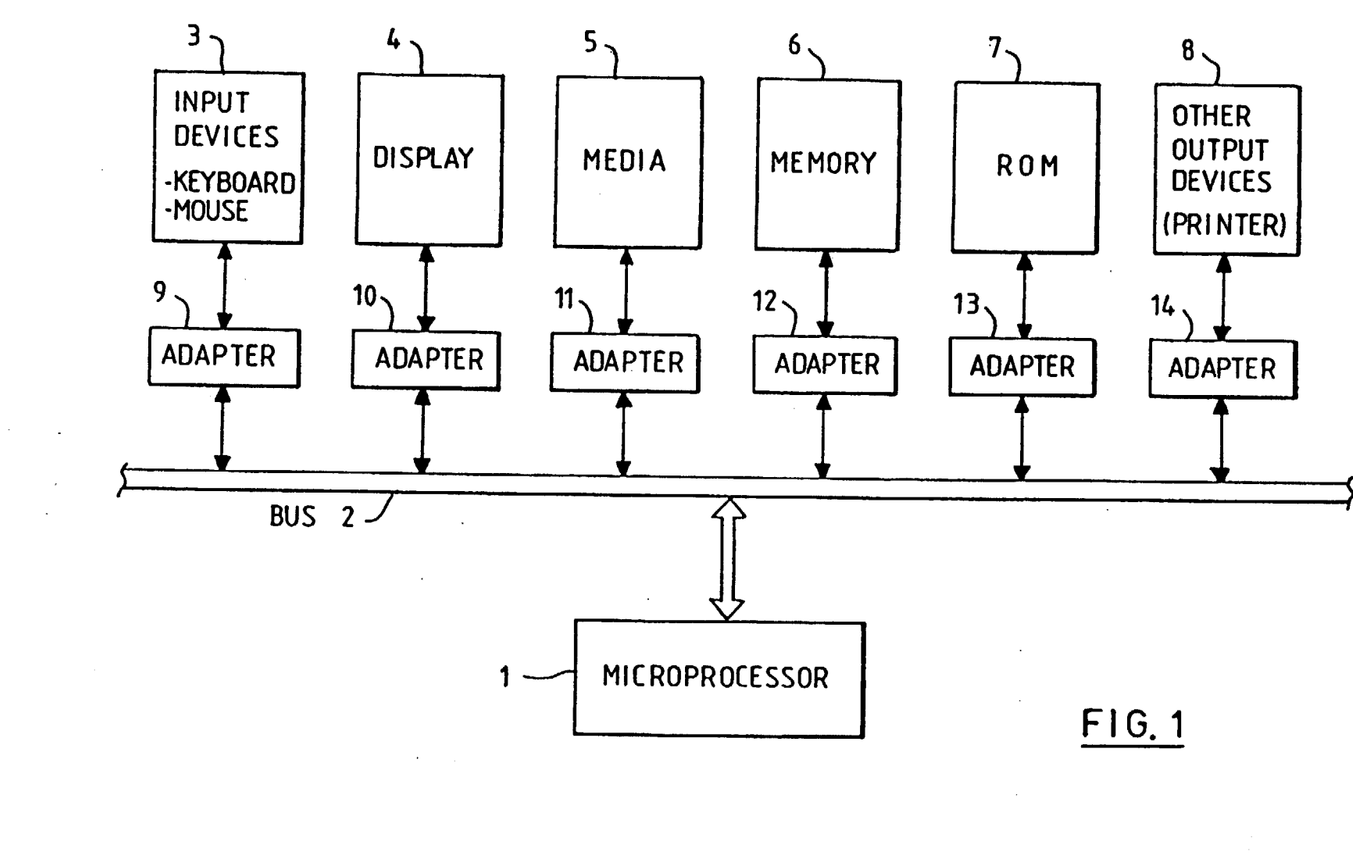
FIG. 1 is a schematic block diagram of the hardware of a computer system on which the invention may be implemented.

FIG. 1 illustrates a typical hardware set-up of a personal computer system on which the present invention may be implemented. The computer system comprises a microprocessor 1 which is connected to a system bus 2. The system bus comprises a data, address and control lines. A plurality of I/O devices including user input means (e.g. a keyboard and mouse) 3, a display 4, media (e.g. disk drives) 5, random access memory 6, read only memory 7 and other I/O devices (e.g. a printer or modem) 8 are connected to the bus via respective adapters 9 to 14.

Figure 2:
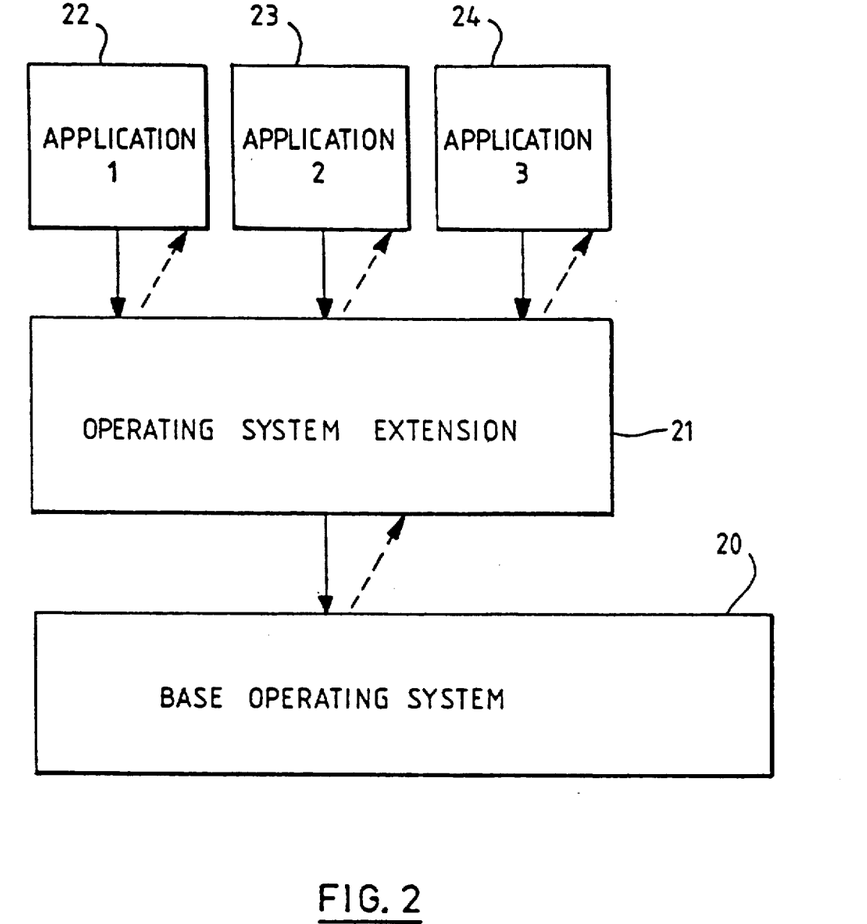
FIG. 2 is a schematic block diagram illustrating aspects of the logical structure of a multiprocessing computer system in accordance with the invention.

FIG. 2 is a schematic block diagram illustrating the logical relationship between an existing multi-tasking operating system (hereinafter referred to as the base operating system 20), a multi-tasking operating system extension (hereinafter referred to as the operating system extension 21) and a plurality of processes in the form of application programs 22, 23, 24, each of which has access to a plurality of resources (not shown).

The base operating system 20 runs on the personal computer hardware indicated in FIG. 1 and supports the operating system extension 21, which in turn supports the applications 22, 23, 24. In a preferred implementation of the present invention, the base operating system 20, the operating system extension 21 and the applications 22, 23, 24 are all to be provided in the form of software from the media 5 and stored, in use, in the random access memory 6. It should be noted, however, that this is not essential to the invention, as at least some of the logic to be described later may be down-loaded over a communications link, or stored in ROM, or provided in the form of hard-wired special purpose logic. In FIG. 2, the solid arrows represent calls down the hierarchy and the dotted arrows represent the passing of control information up the hierarchy.

The operating system extension 21 could be combined with a base operating system to form a new enhanced operating system. In other words, the logical separation indicated between the base operating system and the extension need not be there. Alternatively, however, the operating system extension 21 can be provided as a multi-tasking application which runs on a prior art basic operating system 20 and itself supports a plurality of user applications 22, 23, 24.

The base operating system 20 provides a multi-tasking environment with semaphore support and functions to notify a process 22, 23, 24, via the operating system extension 21, that it is being terminated. This environment may also define processes and threads as the subject of ownership and execution respectively. A process can own many threads, which can be thought of as sub-processes, whereas a thread belongs to one and only one process. Processes and threads are terms which are known to the person skilled in the art.

FIGS. 3A to 3E illustrate part of the logic which is provided in the operating system extension 21 in order to provide the functions of the present invention. Only those aspects of the logic of the system which are important for an understanding of the present invention are shown in the figures. The operating system extension may provide other features as are required, such as an object-based environment, windowing functions, and so on. However, these do not form part of the present invention and are accordingly not described herein.

In order to manage the access to system resources by the processes, a multiprocessing computer system in accordance with the present invention employs a resource access restriction which is well known in the art, namely that at any one time there may be either multiple read access or a single, exclusive write access to a resource. This has the effect that, when a thread is changing a resource, all other accesses are prevented until the change is complete. As a result, a thread accessing the resource can assume that nothing in the resource will have changed for the duration of its access apart from any changes it has itself made. This restriction has a second advantage. The resource may comprise many items which cannot be changed in one atomic instruction. However, the interpretation of these items may be such that the value of one restricts the meaningful values of others. Thus there is a period between changing the first item and changing the others when the resource has no meaningful interpretation, no thread should be allowed to read the resource during this period other than the one which is changing it.

Typically, this restriction has been implemented by tracking the current number of read accesses per resource both globally (i.e. for all processes) and locally (i.e. the count for each process) and employing a semaphore for each resource to serialize access to the read counts associated with that resource. Write operations to a resource are only permitted when all the read access counts are zero for that resource.

In effect, four functions need to be provided, namely to gain read access, to end read access, to gain write access and to end write access. These functions, which will be described in detail later, will be referred to hereinafter as StartRead, EndRead, StartWrite and EndWrite, respectively. Each of these functions has traditionally been provided by an application program running on the system operating system.

StartRead is a function which enables a process to request a multi-tasking operating system for read access to a resource and EndRead is a function which enables a process to relinquish the resource when the read operation has been completed. StartWrite and EndWrite are functions which similarly enable a process to request the operating system for write access to the resource and to relinquish that resource when the writing operation is complete. When a read or write request by a process is granted, the process is said to hold a read or write permit, respectively, until the permit is relinquished as will be explained later. The resource semaphore is not held between the end of the StartRead function and the beginning of an EndRead operation in order to allow other readers access to access the resource, but is held between a StartWrite operation and an EndWrite operation to ensure exclusive access when writing. Both the semaphore and the global read count for each resource must be available to any thread which can access the resource. Consequently, they are held as part of the resource itself. However, the local read count does not need to be accessed by processes other than the one with which it belongs. Accordingly the local read count can be held as part of the process.

The tracking of the read counts is complicated by the fact that a process may be terminated early by the multi-tasking operating system in response to an abort instruction. The early aborting of a process can mean that a read request and/or existing read permits for that process are pending when it is aborted and consequently that the counts mentioned above may need to be reset in order to maintain system integrity. In order to deal with this situation, it has been necessary in the past for the applications to provide what is termed exit processing logic which can be called by the operating system each time a process terminates.

Where a process has not made any requests to use the resource at the time it is terminated, then no special necessary. Where the process has made some access requests which have not yet been processed, however, some remedial action must be performed. It is the exit processing logic of the application process which has traditionally been responsible for undoing all access requests and for leaving the resource in a suitable state for other processes to use (this may be the deleted state, where other processes are prevented from using it and it does not occupy storage).

Notification of process termination is traditionally achieved by the process calling the operating system to request an addition to an Exit List. At the time the process does this, it provides the address of a routine to execute when the process is about to terminate. The Exit List is a list of entry points to routines which are to be executed when a process terminates, one list per process being maintained by the operating system. The routine can be executed by any one of the process's threads and should take a fairly short time to execute. A thread executing this routine is called an Exit List Processor. In other words, in the prior art, the exit list processor is provided by each process running on the operating system.

The Exit List Processor must be able to identify what access permits are held against which resources and, in the case of read accesses, it must identify how many are held. Several threads owned by a process could have read access permits for the same resource. Identifying the resources concerned is achieved by recording, per process, the identity of every resource for which a write permit is held. For read permits not just the identity must be recorded but also the number of permits held per resource. This is done by maintaining two further lists, one of identifiers or resources to which the process has write access (i.e. a Write List), the other of identifiers or resources to which read access is granted (i.e. a Read List). Associated with every identifier on the read list is a count of the number of read permits currently held against that resource by this particular process. These further lists are then held in memory accessible only by the process.

All threads of the same process can access the same data, although they will each be independent in the sense that they have different stacks, etc. This means that the read and write lists are visible to all threads of the process, so a means of serializing access to the lists must be employed. One known way of achieving this is for the operating system to designate a so-called "critical section" for a thread such that all other threads of a process are prevented from running until the initiating thread exits the critical section. Alternative methods could be to use an additional semaphore function. It is assumed here that the base operating system designates critical sections, the limits of which are defined by operating system functions referred to here as EnterCriticalSection and ExitCriticalSection.

The basic functions provided by the Exit List Processor on being called in connection with the termination of a process are to:

a) release the semaphore of every resource identified in the write list; and decrement the global read counter of every resource identified in the terminated process's read list by the amount the local read count associated with that resource, and release any semaphores held by the read list items.

Despite all the precautions taken in the prior art, it has been identified that the known mechanism for dealing with process termination is potentially vulnerable if the process terminates abnormally in between the updating of the local and global read counts. These update operations are performed in the known system by separate machine instructions, with the result that process termination can occur between the updates. The difficulty is to detect whether the process was terminated at this point and if so, what remedial action should be taken by the exit processing logic.

During performance of the StartRead function for example, the thread could be terminated between modifying the local read count in the process's read list and incrementing the resource's global read count. In this case, there could be loss of system integrity because the Exit List Processor would decrement the resource's global read count by one more than this process had incremented it. When performing the EndRead function, a similar problem could occur, except that the Exit List Processor would decrement the resource's global read count by one less than this process had incremented it.

The difficulty for the Exit List Processor is to identify those situations when the read count held in the read list is not the correct amount by which to decrement the resource's global read count, and when this is the case to determine the correct value. This problem has either not been recognized before, or if it has been recognized, then it has been ignored. An illustration of how errors could occur in the prior art is described later with respect to FIG. 4D.

The solution to this problem, as incorporated in a multiprocessing system in accordance with the invention is described with reference to FIGS. 3A, 3B, 3C, 3D and 3E.

The solution to the problem comprises the recording of expected values of the local read count in the process's read list and the resource's global read count immediately before they are changed during performance of the StartRead and EndRead functions and causing the Exit List Processor to test whether the actual values match the intended values. These expected values of the local and global counts can be stored in respective registers. The registers may be separate hardware registers. However, as M registers may be needed for the global counts and M×N registers for the local counts (assuming that there are M resources and N processes), the registers will normally be configured in storage accessible to the process and the operating system extension. This technique assumes that the variables cannot be altered in the intervening period, which is correct as the resource is locked by a semaphore. A comparison of the actual and intended values will, in the case where there is a difference, identify whether the interrupted operation was an increment or a decrement and whether the local read count is one too many or one too little. The Exit List Processor is thus able to determine exactly how many times the global read count was incremented by the terminated process and therefore how many to decrement it by.

In the following description, the read count of read permits for all processes of a given resource is identified by the term "Global Read Count" (abbreviated to "G" in FIG. 3), the count held in the process's read list and indicating the number of read permits held by this process for a given resource is identified by the term "Local Read Count" (abbreviated to "L" in FIG. 3), with "TempLocal" ("TL" in FIG. 3) and "TempGlobal" ("TG" in FIG. 3) having meanings only during the calculation of the new read count value. In this particular example a variable "Critical ID" ("CID" in FIG. 3) is used to identify which resource is being changed, "Resource Identifier" ("RID" in FIG. 3) being a unique identifier for that resource. Although only one Local Read Count is referred to in the following description, it should be appreciated that there will be one associated with each process for each resource accessed by that process. Similarly, although only one Global Read Count is referred to, there will be one for each resource. These counts will be held in storage by the operating system extension with the global counts being accessible to all processes and the local counts being accessible to the appropriate process.

The logic of the StartRead, StartWrite, EndRead and EndWrite calls are set out below with reference to FIGS. 3A, 3B, 3C and 3D respectively. The step numbers identified below refer to the reference numerals identifying the logic function boxes in the figures. Each of the following logic functions would normally comprise a section of code which forms part of the operating system extension and is executable in response to a call from the application processes.

Figure 3A:
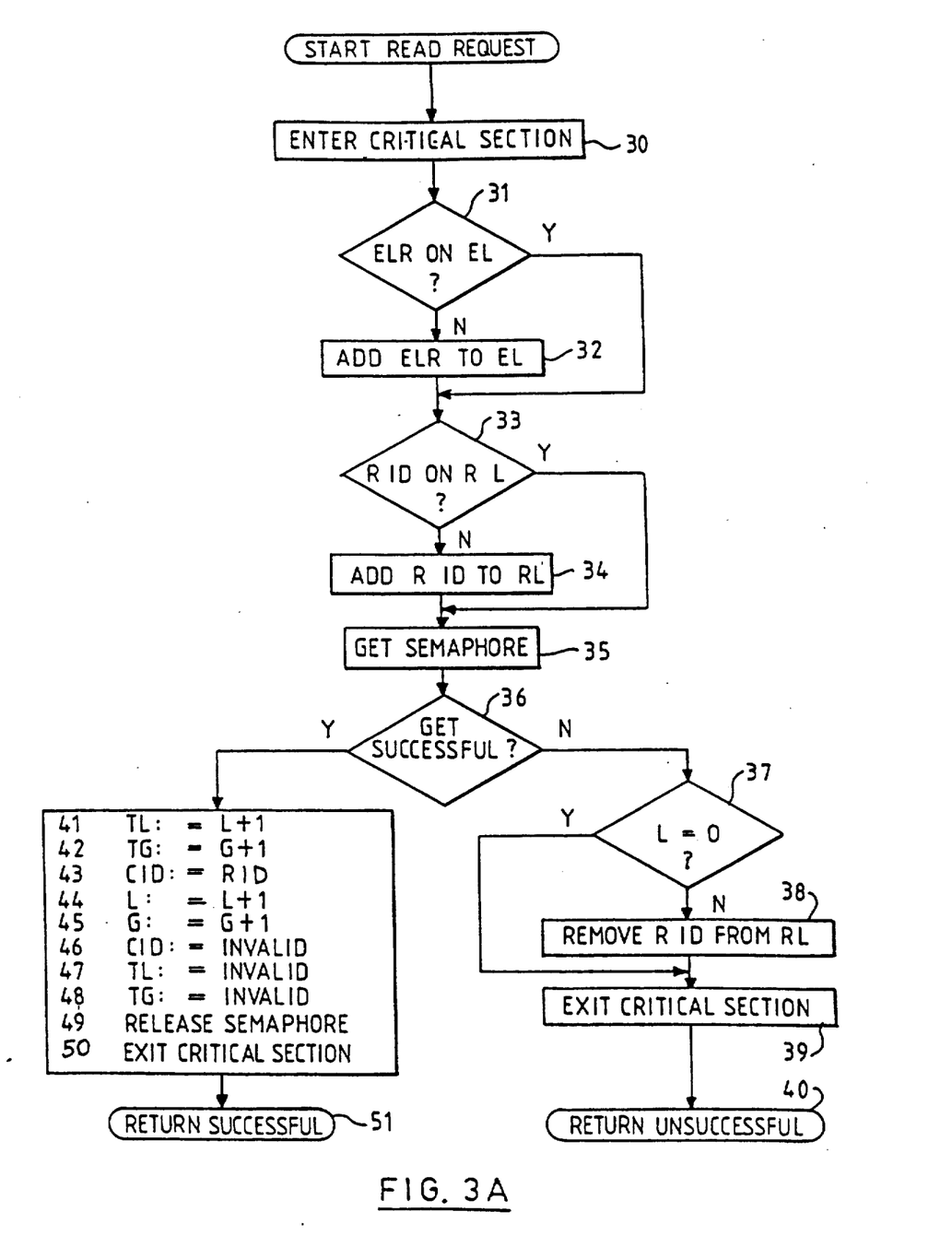
FIGS. 3A to 3E are flow diagrams illustrating a part of the logic of a specific embodiment of the invention.

The phases involved in performing the StartRead function are described below with reference to FIG. 3A.

1) Enter Critical Section—Step 30. This is a call to the operating system which, on completion, locks out other threads from the same process.
2) Add the Exit List Routine to the Exit List—Steps 31, 32. The test in step 31 is made so that the exit list routine is only added once to the exit list in step 32.
3) Add Resource Identifier to the Read Access List—Steps 33, 34. The test in step 33 is made so that the Resource Identifier is only added once to the Read Access List in step 34.
4) Get semaphore—Steps 35, 36 If the attempt in step 36 to access the resource's semaphore is unsuccessful, then the Resource Identifier is removed from the read list at step 38 if the local read count found in step 37 to be zero, (i.e. there are no more read operations of the resource by this process), otherwise the Resource Identifier is retained in the list, and then the Critical Section is terminated at step 39 and control is returned at step 40 by the StartRead logic indicating that the attempt to request read access was unsuccessful.
5) If the attempt in step 36 to access the resource's semaphore is successful, then the following operations are performed:

| Step 41: | TempLocal | := LocalReadCount + X. |
|---|---|---|
| Step 42: | TempGlobal | := GlobalReadCount + X. |
| Step 43: | Critical ID | := ResourceID; |
| Step 44: | LocalReadCount | := LocalReadCount + X; |
| Step 45: | GlobalReadCount | := GlobalReadCount + X; |
| Step 46: | CriticalID | := invalid; |
| Step 47: | TempLocal | := invalid; |
| Step 48: | TempGlobal | := invalid; |
| Step 49: | Release Resource's semaphore; | |
| Step 50: | ExitCriticalSection | |
| Step 51: | Return control indicating that the attempt to request read access was successful | |

In steps 41 and 42 the expected values of the Local Read Count and the Global Read Count are stored in the temporary storage locations TempLocal and TempGlobal respectively. Note that an increment of "X" is indicated above at steps 41, 42 (also steps 44 and 45). The value "X" may be "1", as indicated in the drawings, but could be any other number depending on the number of read operation to be performed. In step 43 the identifier of the resource is stored in the variable Critical ID. In steps 44 and 45 the Local Read Count is first updated followed by the Global Read Count. In steps 46, 47 and 48, CriticalID, TempLocal and TempGlobal are reset to invalid values. (Note: Although not indicated here, TempLocal and TempGlobal could be reset to zero immediately before step 41 as discussed earlier). In the case of CriticalID this could, for example, be null and in the case of TempGlobal and TempLocal, this could be minus one. In step 49 the resource's semaphore is released. In step 50 the Critical Section is exited, releasing the other threads of the process. In step 51 control is returned to where it came from with an indication that the attempt to request read access was successful (i.e. that a read permit for the resource in question has been placed on the process's read list).

If the StartRead function successfully terminates, other processes have access to the read counter as the semaphore has been released. The process that initiated the StartRead function is thus able to read until it initiates an EndRead function, or until it is terminated.

The steps involved in performing an EndRead function described immediately below with reference to FIG. 3B.
1) Enter Critical Section—Step 52. This is call to the operating system which, on completion, locks out other threads from the same process.
2) Get semaphore—Steps 53, 54. If the attempt in step 53 to access the resource's semaphore is unsuccessful, then the Critical Section is terminated at step 55 and control is returned at step 56 by the EndRead logic indicating that the attempt to relinquish a read permit was unsuccessful.
3) If the attempt in step 54 to access the resource's semaphore is successful, then the following operations are performed:

| Step 57: | TempLocal | := LocalReadCount − X; |
|---|---|---|
| Step 58: | TempGlobal | := GlobalReadCount − X; |
| Step 59: | CriticalID | := ResourceID; |
| Step 60: | LocalReadCount | := LocalReadCount − X; |
| Step 61: | GlobalReadCount | := GlobalReadCount − X; |
| Step 62: | CriticalID | := invalid; |
| Step 63: | TempLocal | := invalid; |
| Step 64: | TempGlobal | := invalid; |
| Step 65: | Release Resource semaphore. | |

In steps 57 and 58 the expected values of the Local Read Count and the Global Read Count are stored in the temporary storage locations TempLocal and TempGlobal respectively. Once again, the value "X" may be "1" as indicated in the drawings, but could be some other value. In step 59 the identifier of the resource is stored in the variable Critical ID. In step 60 the Local Read Count is first updated followed by the Global Read Count. In steps 62, 63 and 64, CriticalID, TempLocal and TempGlobal are reset to invalid values as before in the StartRead function. (Note: Although not indicated here, TempLocal and TempGlobal could be reset to zero immediately before step 57 as discussed earlier). In step 65 the resource's semaphore is released.
4) Remove Resource Identifier from Process's Read List—Steps 66, 67. The Resource Identifier can be removed from the process's read list in step 67 if the Local Read Count is zero (step 66) as this means that the process has no read permits remaining for that resource.
5) Exit Critical Section and return—Steps 68, 69. In step 50 the Critical Section is exited, releasing the other threads of the process. In step 51 control is returned to where it came from with an indication that the attempt to relinquish a read permit was successful (i.e. that a read permit for the resource in question, and the Resource Identifier if appropriate had been removed from the Process's Read List).

The phases involved in performing the StartWrite function are described below with reference to FIG. 3C.
1) Enter Critical Section—Step 70. This is a call to the operating system which, on completion, locks out other threads from the same process.
2) Add the Exit List Routine to the Exit List—Steps 71, 72. The test in step 71 is made so that the exit list routine is only added once to the exit list in step 72.
3) Add Resource Identifier to the Write Access List—Steps 73, 76. If, in step 73, it is determined that the resource identifier is already on the write list, then the current request cannot be met as only one write request is possible at any one time. In this case the critical section is exited at step 74 and control is returned at 75 with an indication that the write request was unsuccessful. If, in step 73, it was determined that the Resource Identifier was not on the Write List, then the Resource Identifier is added to that list in step 74.
4) Get semaphore—Steps 77, 78. If the attempt in step 77 to access the resource's semaphore is unsuccessful, then the Resource Identifier is removed from the Write List at step 79, the Critical Section is terminated at step 74 and control is returned at step 75 by the StartWrite logic indicating that the write request was unsuccessful.
5) If the attempt in step 78 to access the resource's semaphore is successful, then a test is made at step 80 to see if the Global Read Count is zero.

If the Global Read Count is not zero, this means that there is at least one read permit pending and accordingly, it is not possible to write to that resource. Accordingly, the Resource Semaphore is released in step 80', the Resource Identifier is removed from the Write List at step 79, the Critical Section is terminated at step 74 and control is returned at step 75 by the StartWrite logic indicating that the write request was unsuccessful.

If the test at step 80 shows that the Global Read Count is zero, then there are no read permits pending for this resource and accordingly, a write permit may be granted. Accordingly, the Critical Section is exited at step 81 and control is returned at step 82 with an indication that the write request was successful.

It should be noted that if the StartWrite function terminates successfully at step 82, the semaphore is not released. As a result of this, other processes do not have access to the read counter. The process that initiated the StartWrite function thus has exclusive access to the resource until it initiates an EndWrite function, or until it is terminated. The steps involved in performing an EndWrite function described immediately below with reference to FIG. 3D.
1) Enter Critical Section—Step 83. This is a call to the operating system which, on completion, locks out other threads from the same process.
2) Release Resource semaphore—Step 84.
3) Remove Resource Identifier from the WriteList—Step 85.
4) Exit Critical Section and return—Steps 86, 87. In step 50 the Critical Section is exited, releasing the other threads of the process. In step 51 control is returned to where it came from.

In the following the Exit List Logic will be described with reference to FIG. 3E. In the preferred embodiment of the invention this logic is provided in the form of code which forms part of the operating system extension and is executable in response to a call from the application processes.
1) At step 88 a test is made whether the Critical ID has a value which could not be that of a Resource Identifier, that is, an invalid value. If the value of the Critical ID is invalid, then the process concerned was not terminated in a vulnerable area of the code. The vulnerable area of the code was that between the locations in the logic described with reference to FIGS. 3A and 3B when the Critical ID was set to the value of the resource concerned. Accordingly, the Exit List Processor can perform conventional Exit List processing as set out in step 89 as the local and global read counts are accurate, and then return in step 90.

2) If the Critical ID is found at step 88 to have a valid ID, then a test is made at step 91 to determine whether the termination of the process occurred between the updating of the local and global read counts, in which case the counts will not be accurate. The termination is determined to have occurred at this point if "TempGlobal < > GlobalReadCount and TemppLocal = LocalReadCount".
3) If the test is negative in step 91, then it is determined that the termination did not occur between the updating of the local and global counts and accordingly the local and global counts are accurate. The Exit List Processor thus performs conventional Exit list processing as set out in step 89 and then returns in step 90.
4) If the test is positive in step 91, then the value of the Local Read Count is decremented by the numerical difference between TempGlobal and GlobalReadCount. This is done in FIG. 3E by performing a further test in step 92 to determine whether "TempGlobal > GlobalReadCount" and then, if "TempGlobal > GlobalReadCount", LocalReadCount is made equal to LocalReadCount−1 in step 94, otherwise LocalReadCount is made equal to LocalReadCount +1 in step 93. It is assumed in FIG. 3E that the value "X" mentioned with respect to FIGS. 3A and 3B is "+1" as shown in those figures.
5) Following on from step 93 or step 94, conventional Exit list processing can then be performed in step 89 and control returned in step 90. The conventional Exit List processing referred to above with respect to step 89 comprises the steps of: for each resource in the Write List, release the semaphore; and for each resource in the Read List:
   i) decrement the Global Read Count by the Local Read Count for the process being terminated; and
   ii) release any semaphores still held by the process being terminated.

Figure 3B:
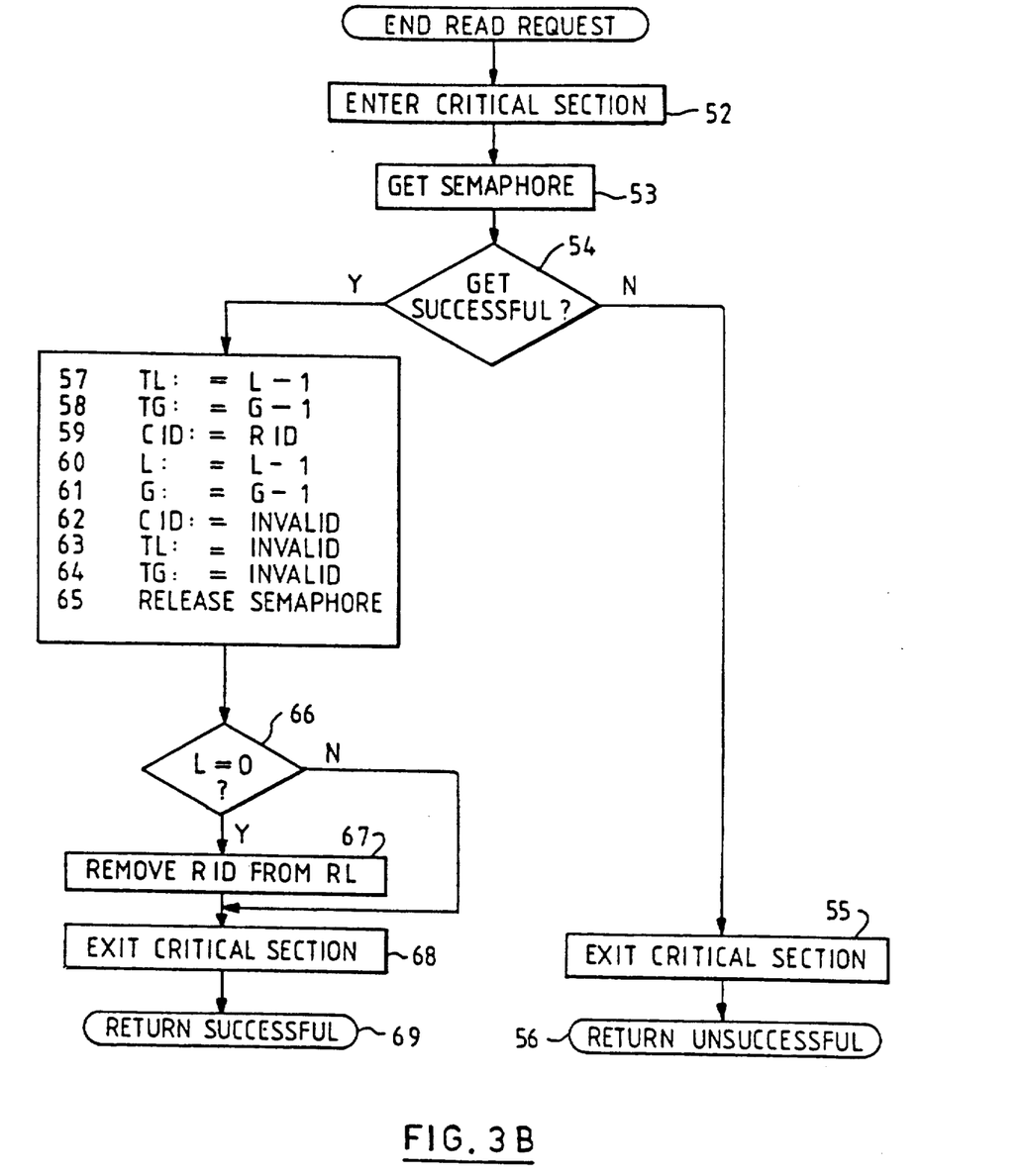
Figure 3C:
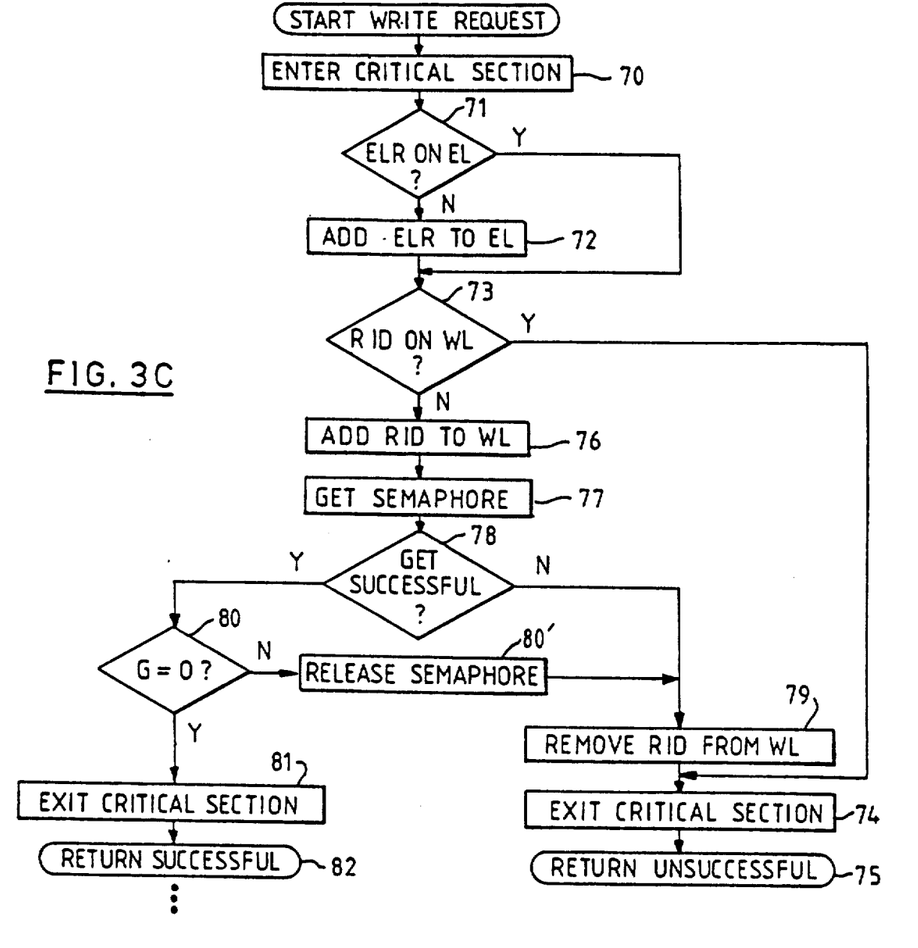
Figure 3D:
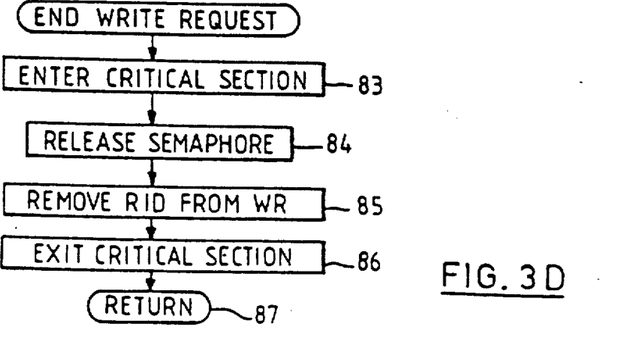
Figure 3E:
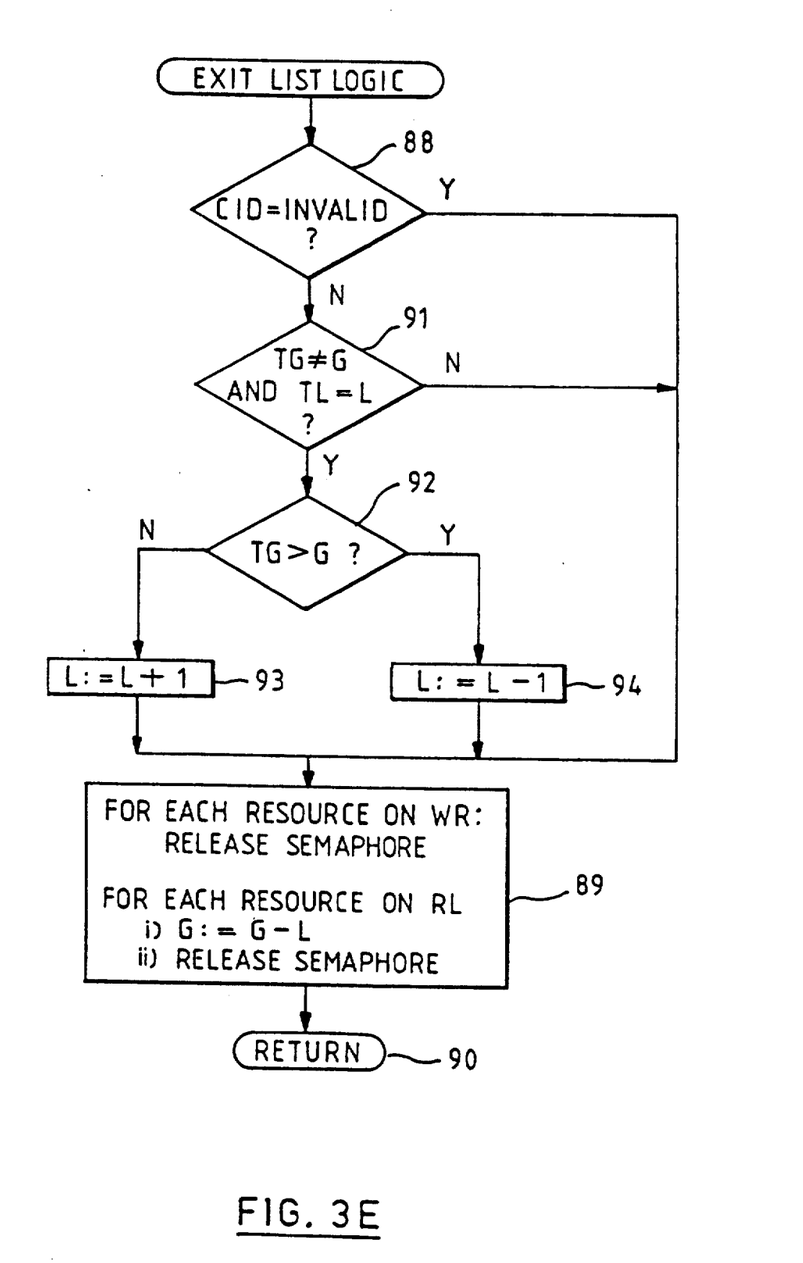

Through the logic indicated above with reference to FIG. 3E the Exit List Processor can identify a potential wrong value for a read count by checking the value of CriticalID, if this is not invalid then the variable will hold the identifier of the resource which was having its Global Read Count altered when the process was signalled for termination. In such a case the thread could have reached one of six stages, three each in StartRead and EndRead. The interesting case is when the Local Read Counter has been updated but the global one has not, i.e. TempLocal = LocalReadCount and TempGlobal < > GlobalReadCount. Then if TempGlobal > GlobalReadCount the thread was attempting to increment the counters whereas if TempGlobal < GlobalReadCount the thread was attempting to decrement the read counters. The local counter can be adjusted accordingly before decrementing it from the global read count. It should be noted that the use of the CriticalID variable is not essential, if other means are provided for identifying the process that has been interrupted. The test indicated at step 91 is sufficient to determine that the counts will be inconsistent as long as the setting of the temporary local and global values is performed in the same order as the updating of the counts themselves. If CriticalID is used, then it does not matter whether the temporary local and global values are updated in the same order as the counts themselves. It is assumed in step 89 that an operation to release a semaphore for a process, where the process does not actually hold a semaphore at that time, will lead to no operation being performed.

Figure 4A:
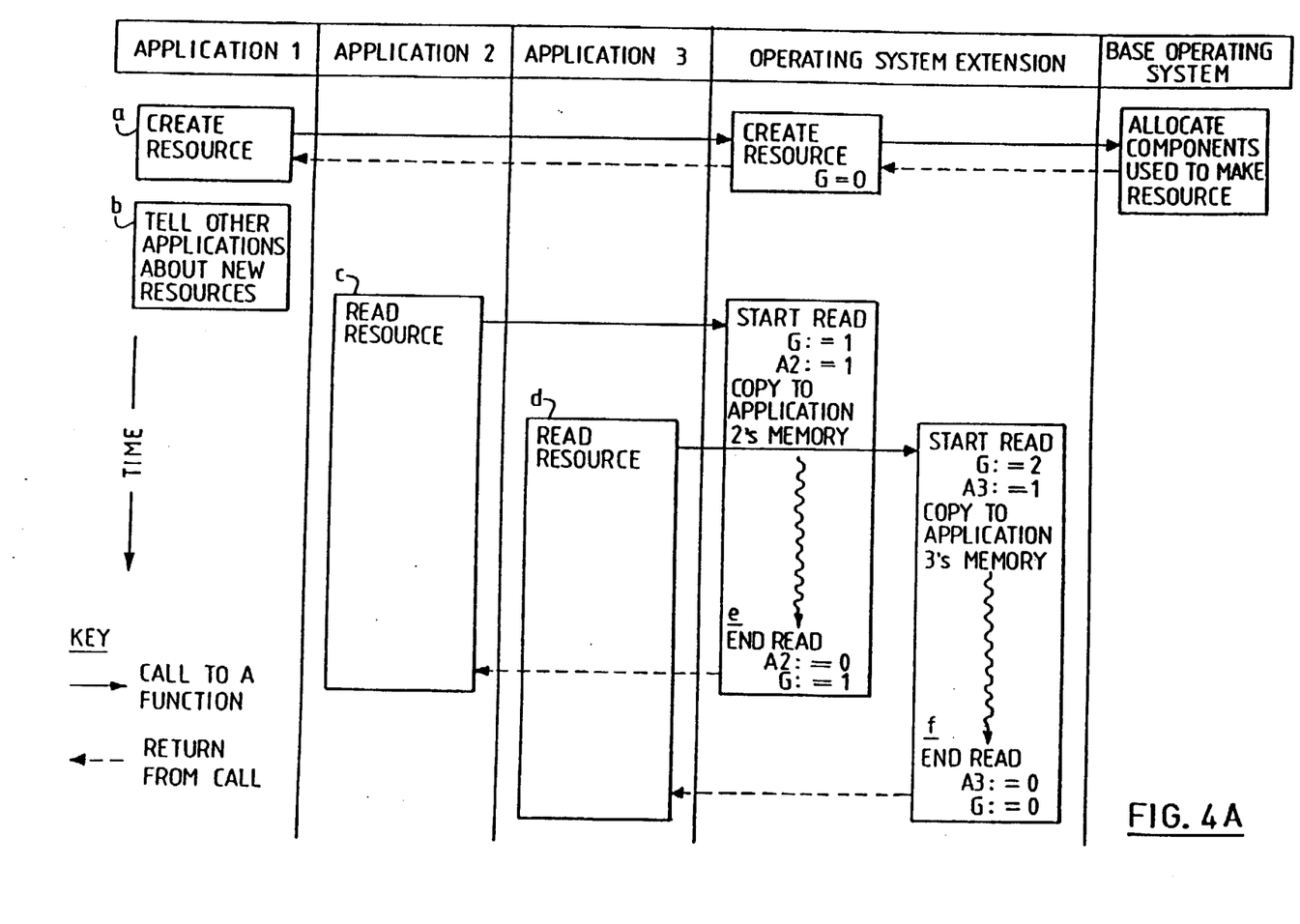
FIGS. 4A to 4C are schematic illustrations of the flow of information in the multiprocessing computer system of FIG. 2.
Figure 4B:
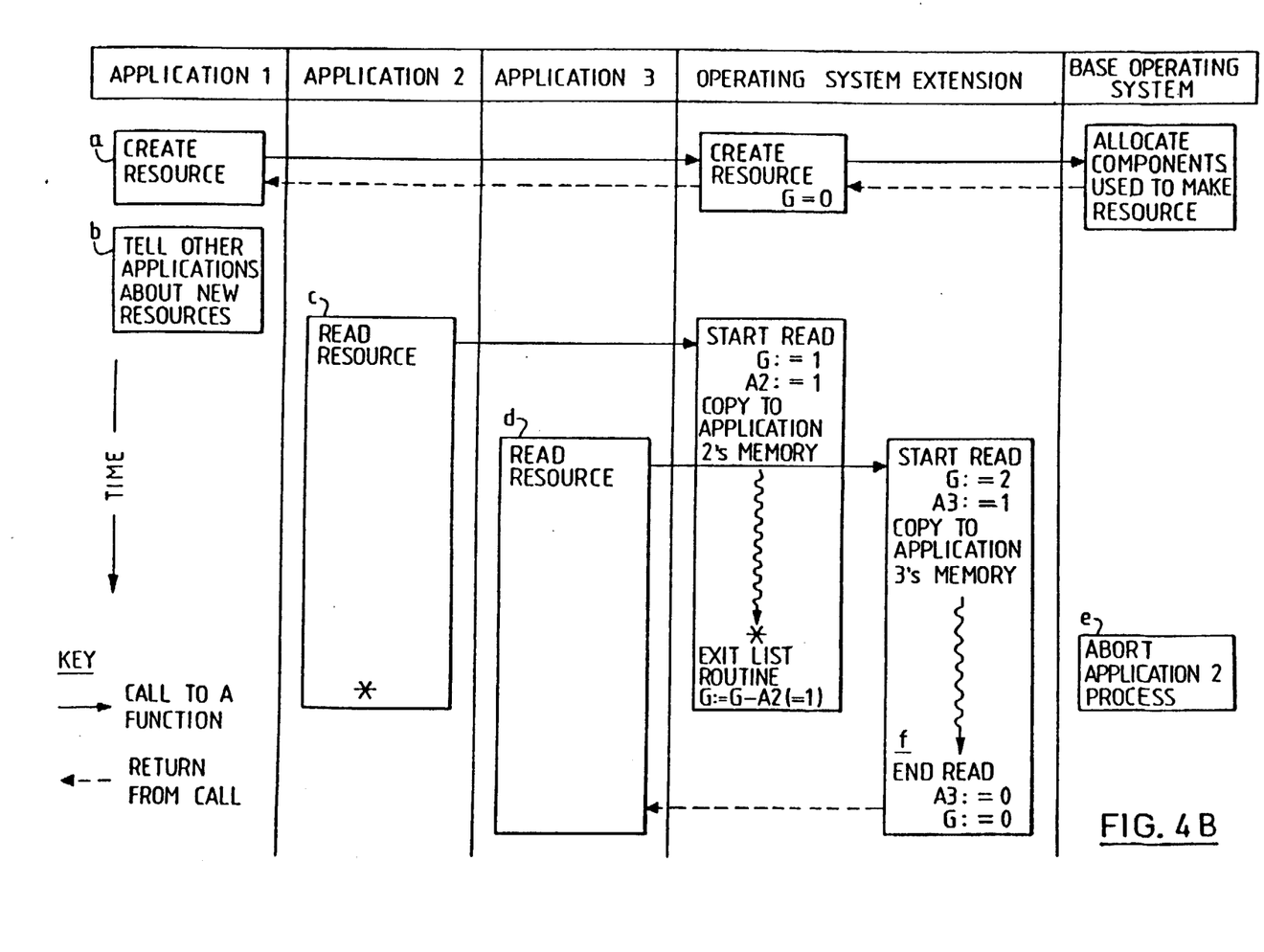
Figure 4C:
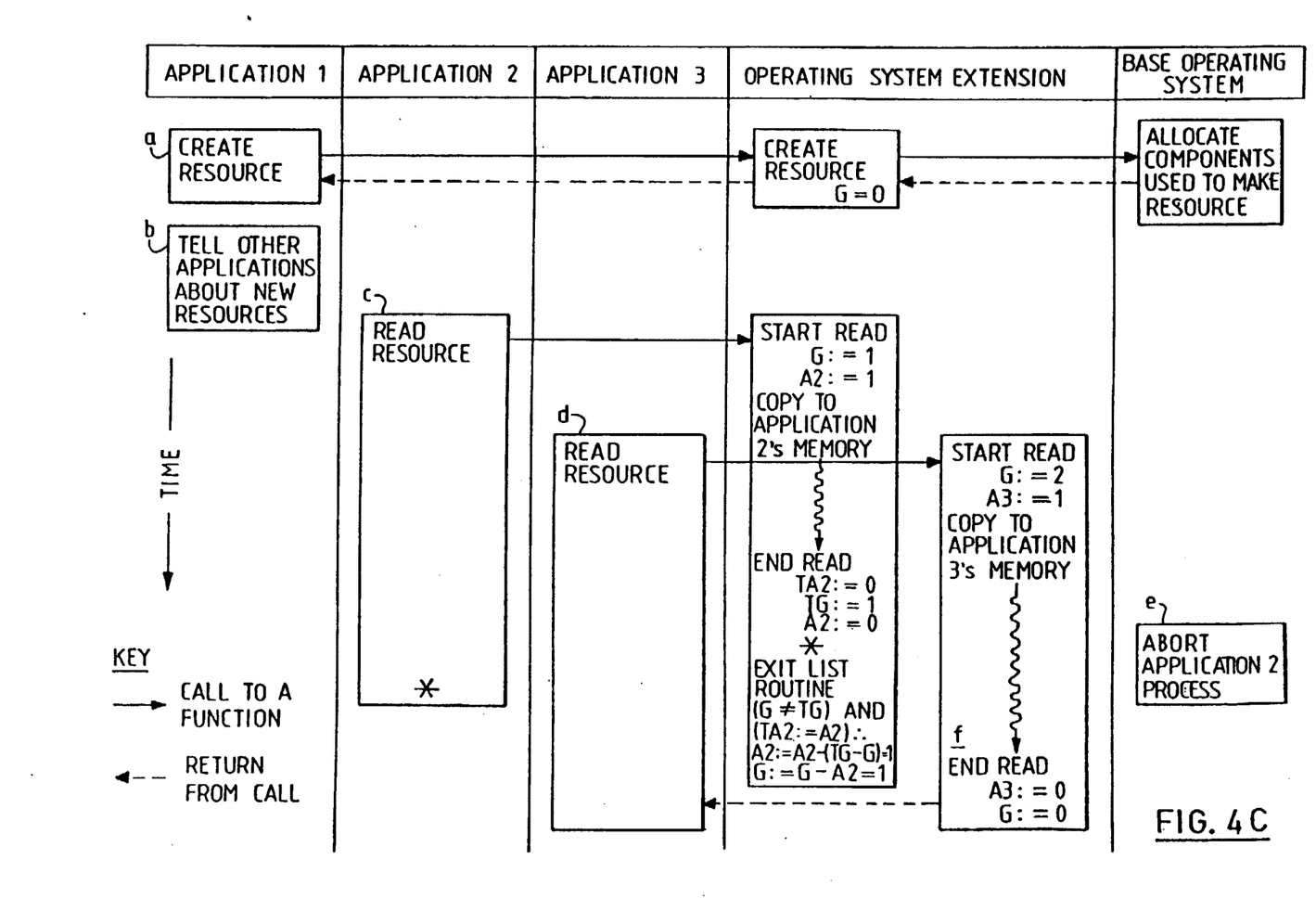

FIGS. 4A to 4C are schematic illustrations of the flow of operations in a multiprocessing computer system in accordance with the invention between the base operating system 20, the operating system extension 21 and three applications 22, 23, 24. In the examples to be described, only one resource is referred to. It should however be understood that this is for ease of explanation only. In practice there will typically be many resources. Also, reference is made to a single Global Read Count and to a single Local Read Count for each application process. In practice there will be a Global Read Count for each resource, and, a Local Read Count for each resource a process is associated with.

- a) The first operation is that Application 1 calls the operating system extension to create a resource. The operating system extension calls the base operating system to allocate the components of the resource. This it does and control passes back via the operating system extension to Application 1.
- b) Application 1 then informs the other applications of the existence of the resource.
- c) Application 2 calls the operating system extension to start a read request. The operating system extension invokes the logic illustrated in FIG. 3A which successfully completes at step 51 with the Global Read Count now at 1 and the Local Read Count for Application 2 at 1.

Application 3 calls the operating system extension to start a read request. The operating system extension invokes the logic illustrated in FIG. 3A which successfully completes at step 51 with the Global Read Count now at 2 and the Local Read Count for Application 3 at 1. The Local Read Count for the Application 2 remains at 1 (this is not accessible to Application 3).

- e) The read operation of Application 2 finishes normally and the EndRead logic illustrated in FIG. 3B is called upon to end the read operation. The logic shown in FIG. 3B completes successfully at step 69 and returns with the Global Read Count at 1 and the Local Read Count for Application 2 at zero.
- f) The read operation of Application 3 finishes normally and the EndRead logic illustrated in FIG. 3B is called upon to end the read operation. The logic shown in FIG. 3B completes successfully at step 69 and returns with the Global Read Count at zero and the Local Read Count for Application 2 at zero.

As, at the end of step (f), the Global Read Count for the resource is zero, this means that the resource is available for other processes to access, both for read and for write operations.

FIG. 4B illustrates a sequence of events, which generally mirrors that in FIG. 4A except that, in FIG. 4B, Application 2 is terminated by the base operating system during reading, i.e. between steps (d) and (e).

The steps (a) to (d) in FIG. 4C correspond to the steps (a) to (d) in FIG. 4A.

- e) Before completing the read operation of Application 2 the base operating system terminates Application 2 and the ExitList Logic is invoked to terminate the process. At the stage that the ExitList logic is invoked, the Local Read Count for Application 2 is at 1 and the Global Read Count is still at 2.

In step 88 of the ExitList logic, the Critical ID will be found to have an invalid ID as the process is outside the bracketed section of the code. Accordingly, conventional ExitList processing will be performed in step 89 of the Exit List Logic with the result that GlobalReadCount (current value 2) is decremented by the Application 2 LocalReadCount (current value 1) to leave a value of 1. The Local Read Count for Application 2 could then set to zero, although this step would be inconsequential when the process terminates.

f) This step in FIG. 4C corresponds to that in FIG. 4A.

As with the sequence illustrated in FIG. 4A, the Global Read Count for the resource is zero at the end of step (f), which means that the resource is available for other processes to access, both for read and for write operations.

FIG. 4C illustrates a third sequence of events, which generally this sequence mirrors those in FIG. 4A and 4B. However, there is an important difference between this sequence and the two earlier ones. In particular, in FIG. 4C sequence, Application 2 is terminated between the updating of the local and global read counts during execution of the EndRead logic (i.e. during step (e) of FIG. 4A).

- a) to (d) These steps in FIG. 4C correspond to the steps (a) to (d) in FIG. 4A.
- e) On completion of the read operation of Application 2 the EndRead logic illustrated in FIG. 3B is called upon to end the read operation. However, in between executing steps 60 and 61 in the EndRead logic shown in FIG. 3B the base operating system terminates Application 2 and the ExitList Logic is invoked to terminate the process. At the stage that the ExitList logic is invoked, the LocalRead Count is at 0 and the Global Read Count is still at 2.

In step 88 of the ExitList logic, the Critical ID will be found to have a valid ID, which means that the process was terminated in the bracketed section, and in step 91 it will be determined that the expression "TempGlobal<>GlobalReadCount and TempLocal=LocalReadCount" holds true. As TempGlobal will be found to be less than GlobalReadCount in step 92, then LocalReadCount is incremented by one (i.e. LocalReadCount: =LocalReadCount −1) in step 93. These operations will have corrected the values of the Local Read Count and accordingly conventional ExitList processing can subsequently be performed in step 89 of the Exit List Logic with the result that GlobalReadCount (current value 2) is decremented by the modified Application 2 LocalReadCount (current value 1) to leave a value of 1. The Local Read Count for Application 2 could then set to zero, although this step would be inconsequential when the process terminates.

f) This step in FIG. 4C corresponds to that in FIG. 4A.

As with the sequence illustrated in FIGS. 4A and 4B, the Global Read Count for the resource is zero at the end of step (f), which means that the resource is available for other processes to access, both for read and for write operations. Without the additional logic present in a computer system in accordance with the invention, however, it would not be possible for the system to recover from such an abnormal termination.

Figure 4D:
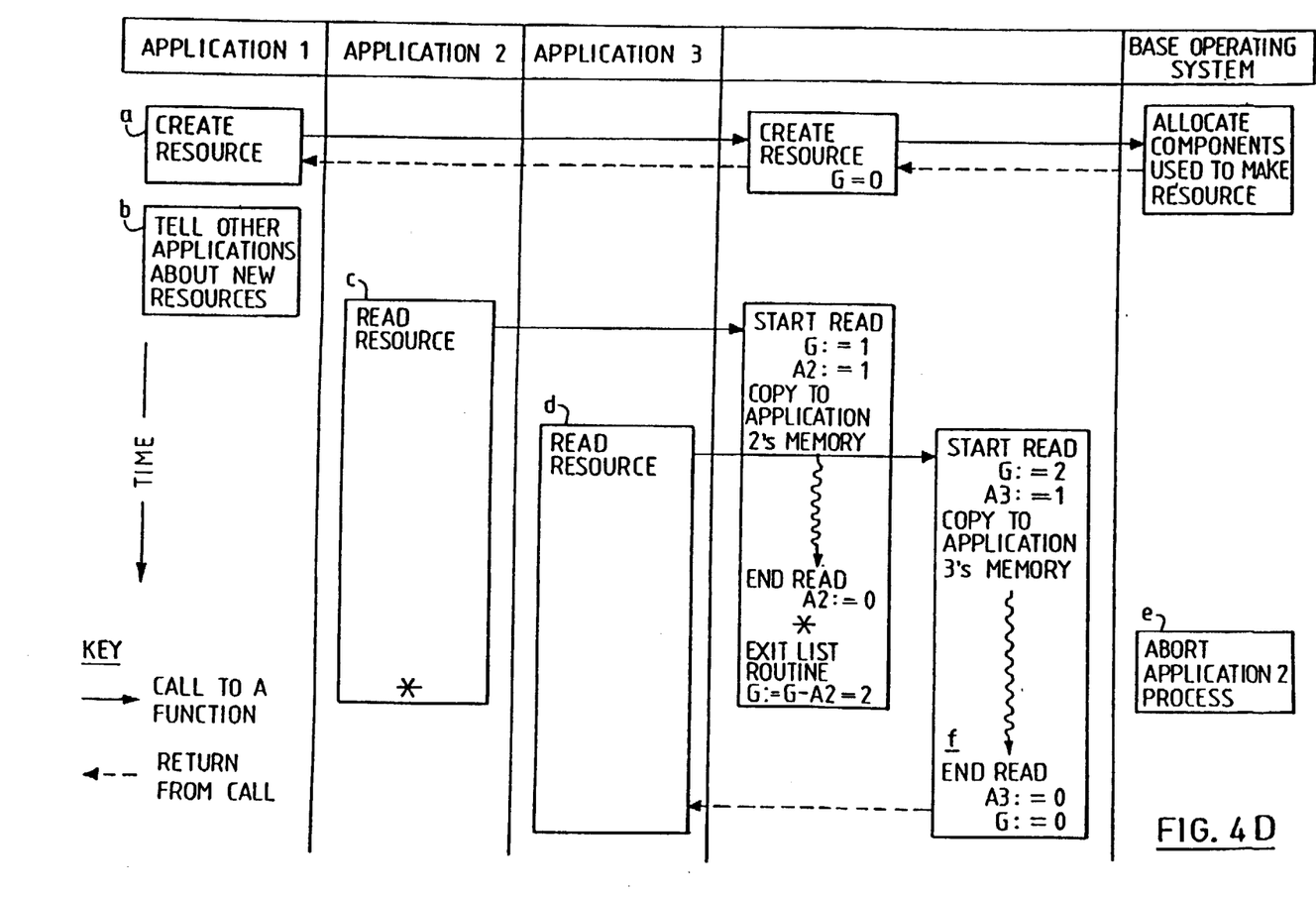
FIG. 4D is a schematic illustration of a possible flow of information in a multiprocessing computer system not in accordance with the invention.

In FIG. 4D a sequence of events corresponding generally to that in FIG. 4C is set out as it would be handled before the invention. For ease of comparison with FIG. 4C, the same format is adopted for FIG. 4D.

a) The first operation is that Application 1 calls the base operating system extension to create a resource. The base operating system allocates that resource and control passes back to Application 1.
b) Application 1 then informs the other applications of the existence of the resource.
c) Application 2 invokes the StartRead logic for requesting read access to the resource. This StartRead logic corresponds generally to the StartRead Logic illustrated in FIG. 3A with the exception that the steps 41, 42, 43, 46, 47 and 48 are not present. The StartRead logic successfully completes leaving the Global Read Count at 1 and the Local Read Count for Application 2 at 1.

Application 3 invokes the StartRead logic for requesting read access to the resource. This StartRead logic corresponds once more to the StartRead Logic illustrated in FIG. 3A with the exception that the steps 41, 42, 43, 46, 47 and 48 are not present. The StartRead logic successfully completes leaving the Global Read Count at 2 and the Local Read Count for Application 3 at 1. The Local Read Count for the Application 2 remains at 1 (this is not accessible to Application 3).

e) On completion of the read operation of Application 2, EndRead logic is called upon to end the read operation. The EndRead logic is here assumed to correspond to that of FIG. 3B with the exception that the steps 57, 58, 59, 62, 63 and 64 are not present. However, in between updating the Local Read Count and the Global Read Count (corresponding to steps 60 and 61 in FIG. 3B), the operating system terminates Application 2 and ExitList Logic is invoked to terminate the process. At the stage that the Exit List logic is invoked, the Local Read Count is at 0 and the Global Read Count is still at 2. The Exit List Logic is assumed to comprise only the steps 95, 89 and 90 illustrated in FIG. 3E. Accordingly, only conventional Exit List Logic processing can be performed in step 89 of the Exit List Logic with the result that the Global Read Count (current value 2) is decremented by the Application 2 Local Read Count (current value 0) to leave a value of 2. The Local Read Count for Application 2 is then set to zero.

f) On completion of the read operation of Application 3, EndRead logic is called upon to end the read operation. The EndRead logic is also assumed to correspond to that of FIG. 3B with the exception that the steps 57, 58, 59, 62, 63 and 64 are not present. The EndRead logic completes with the Local Read Count for Application 2 being decremented by one to zero and the Global Read Count being decremented by one from two to leave a count of 1.

It can be seen therefore that the prior art is potentially vulnerable in that a Global Read Count of 1 may be left on exiting the EndRead Logic, which ties up the resource, when it could otherwise be released to allow a process to write to the resource. Without the invention, it is also possible that the Global Read Count could be set to zero before processes have finished reading the resource This means that a write access could be incorrectly granted at this stage, with the result that the resource could become corrupted.

Although a particular embodiment of the invention has been described above, it will be appreciated that many additions and/or modifications are possible within the scope of the invention as defined in the dependent claims. For example, the invention may be used to maintain resource integrity in any situation in a multiprocessing computer system wherein a local variable which is accessible by a single process and a global variable which is accessible by a plurality of processes and is dependent on the local variable are updated sequentially and wherein the process may be terminated between the updating of the local and global variables, the expected value of the local variable and global variables being stored in first and second storage locations respectively before the local and global variables themselves are updated. If then, the process is terminated, a determination of whether the process was terminated between the updating of said local and global variables can be made by comparing the content of the first storage means to that of the local variable and by comparing the content of the second storage means to that of the global variable and, if necessary, remedial action can be undertaken to correct the values of the variables.

I claim:

1. A multiprocessing computer system in which each of a plurality of processes has access to at least one system resource, the multiprocessing computer system comprising:

local count means for each process to maintain a count of permits for that process to access said resource;

global count means to maintain a count of permits for all processes to access said resource;

update logic for sequentially updating an appropriate local count means and the global count means each time a process requests or relinquishes use of the resource;

exit logic for terminating a process including means for resetting the global count means, characterized in that:

the local and global count means maintain a count of permits to read a resource;

the update logic additionally comprises logic for storing expected local and global count values in first and second storage means respectively, before either of the appropriate local count means or the global count means are updated where the expected value of the local count stored in the first storage means is the current local read count plus an intended local count increment and the expected value of the global count stored in the second temporary storage means is the current global count plus an intended global count increment; and the exit logic additionally comprises logic for comparing the content of the first storage means to that of the appropriate local count means and for comparing the content of the second storage means to the global count means and, in dependence on the results of the comparisons, determining whether the process was terminated between the updating of the local and global count means.

2. A system as claimed in claim 1 comprising semaphore means for ensuring that access may be had to the global count means by only one process at a time.

3. A system as claimed in claim 1 wherein the update logic updates the local count means before the global count means and wherein the exit logic tests whether the content of the first storage means is the same as that of the local count means and whether the content of the second storage means is different from that of the global count means, and, if both conditions are true, decrements the content of the local count means by the numerical difference between the content of the second storage means and that of the global count means.

4. A system as claimed in claim 1 wherein the update logic updates the global count means before the local count means and wherein the exit logic tests whether the content of the second storage means is the same as that of the global count means and whether the content of the first storage means is different from that of the local count means and, if both conditions are true, decrements the content of the global count means by the numerical difference between the content of the first storage means and that of the local count means.

5. A system as claimed in claim 3 wherein the update logic stores the expected value of the local count and the global count in the first and second storage means, respectively, in the same chronological order as it updates the local and global count means.

6. A system as claimed in claim 1 wherein the update logic additionally comprises logic for bracketing a section of logic including that for updating the local and global count means and wherein the exit logic additionally comprises logic for testing whether a process was terminated during execution of the bracketed section of logic.

7. A system as claimed in claim 6 wherein:
the bracketing logic sets the content of at least one of the first and the second storage means to an invalid value before said expected values are stored therein and resets the content of said at least one of the first and second storage means to an invalid value after the local and global count means have been updated; and
the logic for testing the bracketed section of logic tests whether the content of said at least one of the first and second storage means has a valid value.

8. A system as claimed in claim 6 wherein:
the bracketing logic, after storing the expected values, sets the content of a third storage means to the value of a unique identifier for the resource and which, after the updating of the local and global variables, resets the third storage means to an invalid value; and
the logic for testing the bracketed section of logic tests whether the content of the third storage means corresponds to that of a valid identifier, and if so identifies that resource.

9. A method of maintaining resource integrity in a multiprocessing computer system wherein a local variable which is accessible by a single process and a global variable which is accessible by a plurality of processes and is dependent on the local variable are updated sequentially, said local and global variables are read counts for maintaining a count of read access permits to a resource, and wherein the process may be terminated between the updating of the local and global variables, said method comprising the steps of:
a) storing the expected value of the local variable in a first storage means and the expected value of the global variable in a second storage means where the expected value of the local variable stored in the first storage means is the current local read count plus an intended local read count increment and the expected value of the global variable stored in the second temporary storage means is the current global read count plus an intended global read count increment; and then
b) updating the local variable and the global variable sequentially, and
c) if said process is terminated, determining whether the process was terminated between the updating of the local and global variables by comparing the content of the first storage means to that of the local variable and by comparing the content of the second storage means to that of the global variable and, if necessary, undertaking remedial action to correct the values of the variables.

10. A method as claimed in claim 9 wherein a semaphore is associated with the global variable for serializing access thereto.

11. A method as claimed in claim 9 wherein:
in step (b) the local variable is updated before the global variable; and
step (c) comprises the sub-steps of:
(i) testing whether the content of the first storage means is the same as that of the local variable and whether the content of the second storage means is different from that of the global variable, and if both conditions are true;
(ii) decrementing the content of the local variable by the numerical difference between the content of the second storage means and that of the global variable.

12. A method as claimed in claim 9 wherein:
in step (b) the global variable is updated before the local variable; and
step (c) comprises the sub-steps of:
(i) testing whether the content of the second storage means is the same as that of the global variable and whether the content of the first storage means is different from that of the local variable, and if both conditions are true;
(ii) decrementing the content of the global variable by the numerical difference between the content of the second storage means and that of the local variable.

13. A method as claimed in claim 9 wherein, in step (a). the expected values of the local variable and the global variable are stored in the first and second storage means respectively, in the same chronological order as the local and global variables are updated in step (b).

14. A method as claimed in claim 9 additionally comprising steps for bracketing a section of the method and wherein step (c) additionally comprises a sub-step of testing whether a process was terminated during execution of that section.

15. A method as claimed in claim 14 wherein:
the steps for bracketing comprise, in step (a), a sub-step of initially setting the content of at least one of the first and the second storage means to an invalid value before said expected values are stored therein and, in step (b), a sub-step of resetting the content of said at least one of the first and second storage means to an invalid value after the local and global variables have been updated; and
the sub-step of testing comprises testing whether the content of said at least one of said first and second storage means has a valid value.

16. A method as claimed in claim 14 wherein:
the steps for bracketing comprise, in step (a), the sub-step of setting content of a third storage means to the value of an identifier associated with the global variable after the storing the expected values in the first and second storage means and, in step (b), the sub-step of resetting the third storage means to an invalid value after the updating of the local and global variables; and
the sub-step of testing comprises testing whether the content of the third storage means corresponds to that of a valid identifier, and if so, which identifier.

* * * * *